(No Model.)
F. A. OBERER & J. S. KALB.
TRACK SADDLE.
No. 477,570. Patented June 21, 1892.
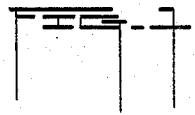
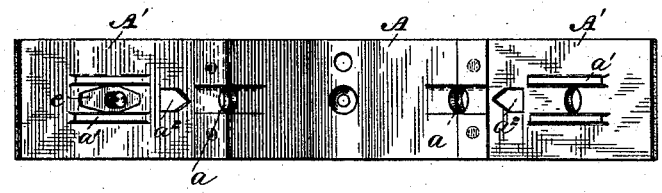
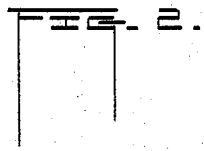
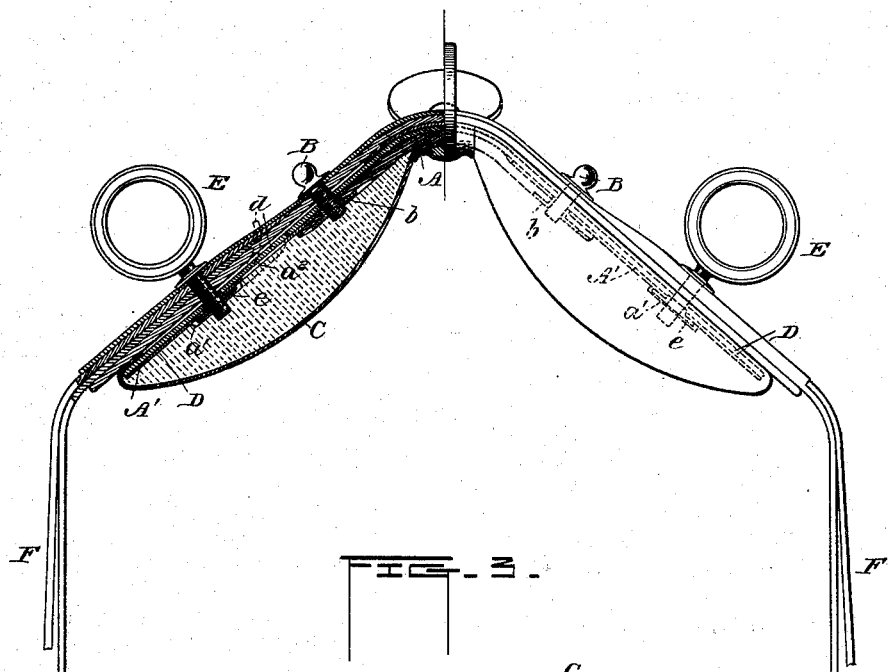
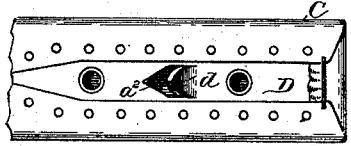
WITNESSES
INVENTORS

UNITED STATES PATENT OFFICE.

FRANK A. OBERER AND JOHN S. KALB, OF CHILLICOTHE, OHIO.

TRACK-SADDLE.

SPECIFICATION forming part of Letters Patent No. 477,570, dated June 21, 1892.

Application filed September 22, 1890. Serial No. 365,704. (No model.)

*To all whom it may concern:*

Be it known that we, FRANK A. OBERER and JOHN S. KALB, citizens of the United States, residing at Chillicothe, in the county of Ross and State of Ohio, have invented certain new and useful Improvements in Track-Saddles; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to harness; and it consists in certain improvements in track-saddles, as hereinafter set forth, and particularly pointed out in the claims.

Heretofore track-saddles have been made with stiff metallic trees, in which the line-rings are secured by burrs or otherwise, the trees being long enough to contain two or three holes, so as to permit the rings to be placed at the desired distance apart. These long trees, however, are inflexible and do not conform closely to the horse's back. They cannot be made shorter than the pads, since the latter must be supported their whole length and would be liable to break should the tree terminate at some point short of the end of the pad. It has been proposed in the case of gig-saddles to use a short iron tree and extend the pad beyond it, with a leather stiffener to reinforce the pad; but in this construction no opportunity is afforded to change the line-rings or to alter the gig-saddle into a track-saddle, the only foundation for the rings being the short iron tree.

In the drawings, Figure 1 is a bottom plan view of our improved track-tree. Fig. 2 is an elevation, half in section, of our track-saddle; and Fig. 3 is a top plan view of one of the pads.

We use a short iron tree A, which contains near each end a hole and recess $a$ for a burr $b$, into which is screwed the pad-screw B. The line-rings can be inserted at this point when it is desired to change the saddle to a gig or buggy saddle.

Riveted or otherwise rigidly secured to the short tree A are plates of metal, preferably spring-steel A', which form a continuation of the tree on each side and extend to the ends of the pads C. A leather piece D is fastened upon and covers the tree A A' from one end to the other, the edges of the pad-covers being tacked to it, as shown in Fig. 3. In each steel plate is formed one or more holes for the shank of the line-ring E, which screws into a burr $e$, resting between two ribs $a'$, formed upon or secured to the plate. A leather shield can be placed under the burr and fastened to the plate to prevent the burr from being lost in the stuffing of the pad. In case, however, it should be desired to change the mountings the burr $e$ can be readily removed through an opening $a^2$ in the tree extension A', said opening being covered by a flap $d$, formed by a V-shaped cut in the leather piece D. The manner of lifting this flap to get at the burr $e$ is shown in Fig. 3 and in dotted lines in Fig. 2. Furthermore, by changing the relative positions of the line-rings and pad-screws from those illustrated the saddle may be transformed from a track to a gig saddle.

The housings, skirts, trace-bearers, and other portions of the saddle not previously referred to are those commonly used and need no special description.

An important function of our saddle is the flexibility of the tree A A'. The plates of spring-steel, while affording a firm support for the pads and for the attachment of the line-rings, nevertheless possess sufficient elasticity to permit the pads to bend and accommodate themselves to the shape of the horse's back.

Its degree of flexibility depends primarily upon the steel extension, but can be altered somewhat, if desired, by carrying the trace-bearer F up beyond the pad-screw B, instead of terminating it at the point shown in the drawings.

Having thus described our invention, what we claim, and desire to secure by Letters Patent, is—

1. In a track-saddle, a short rigid metallic tree A, provided with openings $a$, flexible metallic plates A', secured to said tree, said plates being also provided with openings and ribs $a'$, pads C beneath the trees and plates, pad-screws B, line-rings E, secured to the plates, and burrs $b\ e$.

2. The combination, with the short metallic tree A, of the flexible metallic extensions A', having openings for the line-rings and holes $a^2$, adjacent thereto, the leather piece D, having the flap $d$ to cover the holes $a^2$, the line-rings E, and the burrs $e$, substantially as described.

In testimony whereof we affix our signatures in presence of two witnesses.

FRANK A. OBERER.
JOHN S. KALB.

Witnesses:
 AUGUST SCHMIDT,
 JACOB R. GALBRAITH.